Figure 1:
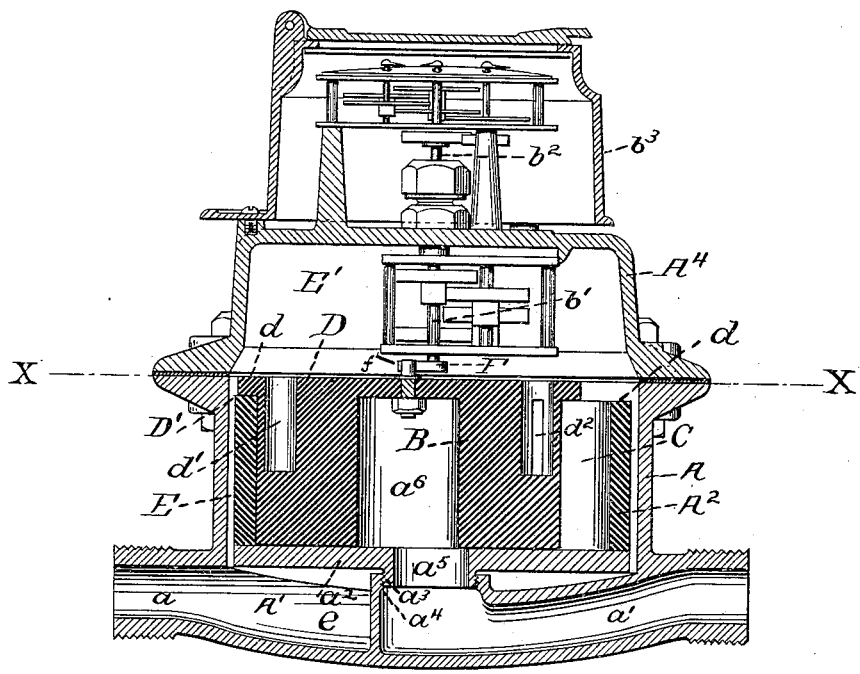

(No Model.)   3 Sheets—Sheet 1.

J. A. TILDEN.
WATER METER WITH REVOLVING PISTON.

No. 353,833.   Patented Dec. 7, 1886.

(No Model.) 3 Sheets—Sheet 2.

J. A. TILDEN.
WATER METER WITH REVOLVING PISTON.

No. 353,833. Patented Dec. 7, 1886.

Witnesses. Inventor.

(No Model.) 3 Sheets—Sheet 3.

J. A. TILDEN.
WATER METER WITH REVOLVING PISTON.

No. 353,833. Patented Dec. 7, 1886.

Witnesses.
J. Mc. Dolan.
Fred. B. Dolan.

Inventor
James A. Tilden
by his atty
Clarke & Raymond.

United States Patent Office.

JAMES A. TILDEN, OF HYDE PARK, MASSACHUSETTS, ASSIGNOR TO THE HERSEY METER COMPANY, OF PORTLAND, MAINE.

WATER-METER WITH REVOLVING PISTONS.

SPECIFICATION forming part of Letters Patent No. 353,833, dated December 7, 1886.

Application filed March 13, 1886. Serial No. 195,142. (No model.)

*To all whom it may concern:*

Be it known that I, JAMES A. TILDEN, of Hyde Park, in the county of Norfolk and State of Massachusetts, a citizen of the United States, have invented a new and useful Improvement in Fluid-Meters, of which the following is a full, clear, and exact description, reference being had to the accompanying drawings, forming a part of this specification, in explaining its nature.

The invention is an improvement upon that described in my Patent No. 324,503, dated August 18, 1885. In said patent I have shown and described a fluid-meter comprising, essentially, a chamber having measuring spaces or recesses, each of which has an inlet and an exhaust port and a loosely-fitted piston confined between two port-plates, having lobes or projections which are adapted to be moved in successive order in said measuring spaces or recesses, and by contact with the walls thereof to first form discharge-spaces and to then by their movement empty them, the head or pressure of the fluid serving to keep the lobes of the piston in contact with the walls of the measuring-spaces, and to move them in their separate or independent measuring chambers or recesses.

My present invention employs a chamber having measuring spaces or recesses like those described in said patent, and a piston of similar construction so far that it has lobes or projections adapted to enter the measuring spaces or recesses, and this portion of my improved piston will be designated the piston proper; but the piston is not held or confined between two plates, as I do not use any upper portplate. The piston is therefore entirely free, so far as the construction of the meter is concerned, to move in any direction in its chamber. It has a projecting flange or ledge of a sufficient width to bear upon the upper surface of the wall of the measuring-chamber, and by the application of the same principle of unequal pressures which I have described in said patent, and upon which I rely to cause the operation of the piston, I am enabled to hold the piston in its chamber while it is being moved therein, so that the excess of pressure not only causes the piston to move about the chamber and its lobes to enter the measuring spaces or recesses thereof in succession, but it also holds the piston in place in its chamber, and so that its lower surface and the surface, or some portion thereof, of its flange are also kept in contact with the surface of the bottom of the meter and the upper edge or surface of the wall of the chamber, respectively. This form of construction has these advantages: First, it reduces the friction upon the piston; second, it enables the meter to free itself from foreign substances of any kind entering the meter with the fluid; third, it prevents such substances from interfering with the action of or the proper and regular movement of the piston; and, fourth, it is cheaper.

Figure 2:
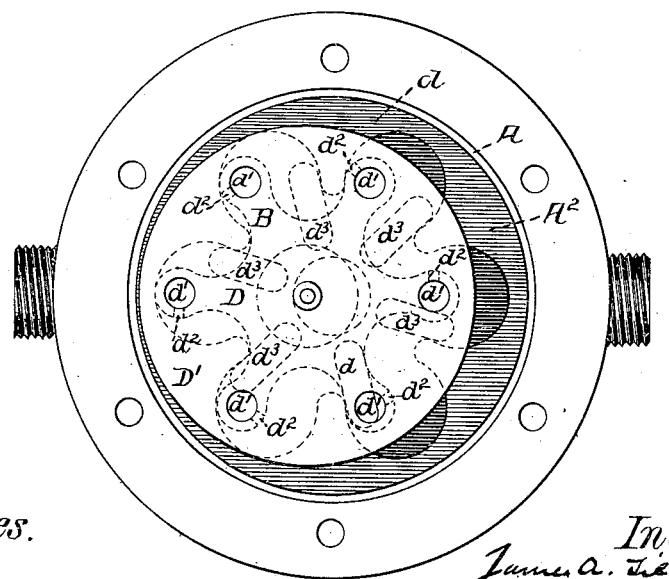
Figure 3:
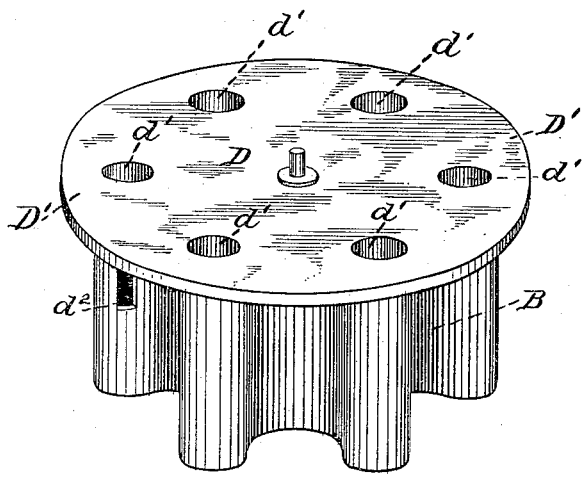
Figure 4:
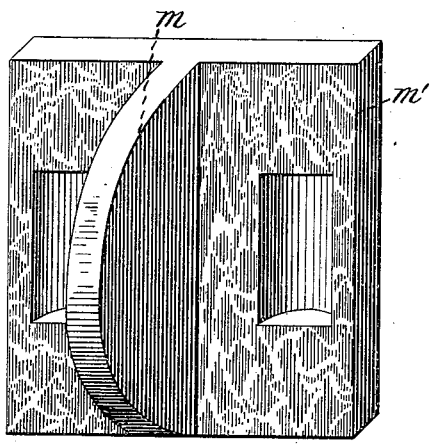
Figure 5:
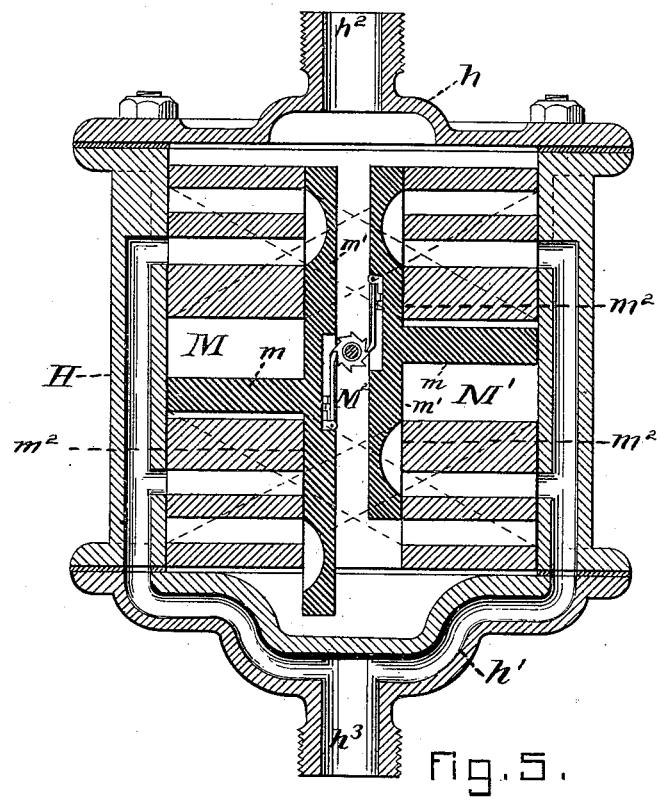
Figure 6:
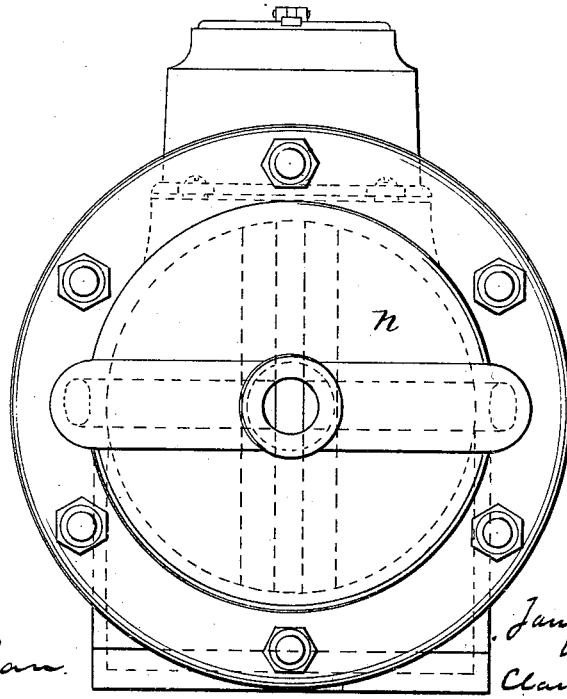

In the drawings, Figure 1 represents a vertical central section of the meter described in my said Patent No. 324,503 as provided with my present invention. Fig. 2 is a horizontal section upon the dotted line $xx$ of Fig. 1, showing in plan the parts of the meter below this line. Fig. 3 is a perspective view of the piston. Fig. 4 is a view of one of the pistons shown in Fig. 5. Fig. 5 is a view in horizontal section of a reciprocating meter containing the features of my invention. Fig. 6 is a view in side elevation thereof.

In Figs. 1 and 2, A is the lower casing or shell of the meter. It forms a chamber for the reception of the piston-chamber wall, and it has the inlet-passage $a$, the distributing-chamber A′, and outlet-passage $a'$.

$A^2$ is the piston-chamber wall. It is similar in shape to that described in my said patent; but instead of fitting tightly the wall or casing of the meter, as therein described, it is mounted upon the plate $a^2$, which forms the lower wall or bottom of the chamber, and is held in place by the screw-sleeve $a^3$, which screws into the screw-threaded hole $a^4$. This plate has the hole $a^5$, which connects the piston-chamber and space $a^6$ in the piston with the outlet $a'$. The piston proper, B, is in many respects like that described in my said patent—that is, it has the lobes or projections which enter the measuring spaces or recesses C of the piston-chamber. It has additionally the upward-extending section D—that is, a portion which extends above the top edge, $d$, of the piston-chamber wall, and the flange D′, extending therefrom, arranged to overlap or extend upon the upper surface of the piston-chamber wall. It also has a passage, $d'$, in each lobe which opens from the top, and has a side opening, $d^2$, into the measuring space or recess in which the lobe operates. The piston-chamber wall is separated from the casing A by a narrow passage or space, E, which unites or connects the distributing-chamber A' with the chamber E', contained within the section $A^4$ of the meter casing or shell. The piston is connected by means of the pin $f$ and wiper-arm F with the shaft $b'$, which communicates motion to the reducing-gear of the registering mechanism. The registering mechanism is operated therefrom by the shaft $b^2$ and is contained within the register-casing $b^3$.

$d^3$ are the outlet-ports, which connect the measuring-spaces with the chamber $a^6$ of the piston and the discharge-outlet $a^5$.

The operation of the meter is substantially as follows: The fluid enters through the inlet-passage $a$ into the distributing-chamber A', and from there it passes through the connection or passage E to the chamber E', filling the chamber and also that portion of the measuring-chamber which is not being emptied by the action of the piston. It enters said portions of the piston-chamber through the ports $d'$ $d^2$, and also through the opening or space between the upper inner edge of the piston-chamber wall and the lower edge of the flange D'. The piston is thus surrounded upon its top or upper surface and upon more than half its side area by fluid under an uncontrolled pressure or head. This disposition of the pressure and fluid in relation to the piston causes the piston to be moved in the measuring-chamber and each lobe in succession to take a circular or continuous path in its respective measuring space or recess, causing it to maintain a contact with the wall of the piston-chamber from the time that its discharge-port is uncovered until it has moved or displaced the fluid from said measuring space or recess through the said discharge-port, and until it is in a position to leave the wall of the measuring space or recess and return to its original position to again operate as before.

Thus far the action of the piston is like that described in my said patent. The head or pressure of the fluid, however, not only serves to move the piston as above described, but it also acts against the upper surface thereof to hold it in place in the measuring-chamber, and in this respect it takes the place of the port-plate of the meter described in my said patent. It does not, however, confine the piston in the piston-chamber in a rigid or unyielding manner, as does the port-plate of my said patent; but while holding the piston within the chamber so that its under surface shall bear against the upper surface of the plate $a^2$ and its flange shall bear against the upper surface, $d$, of the measuring-chamber wall, and, maintaining this contact substantially continuously during the operation of the meter, it still provides the piston with a certain degree of freedom, which is desirable for the purpose of freeing or relieving the meter from sediment, and also for the purpose of allowing foreign substances to pass with the liquid through the meter without disturbing its action. It also provides for the continuous adjustment or fit of the piston in the chamber as it wears, so that the longer the piston is used the better it fits the piston-chamber. The contact between the piston-flange and the upper edge of the measuring-chamber wall is maintained during the interval or time the measuring spaces or recesses are being discharged of their contents, when, of course, it is essential that the fluid shall not enter them from any source. The piston is maintained in the measuring-chamber by excess of pressure upon its upper surface, caused by the fact that the area exposed to the direct pressure of the fluid is greater than the area which is not so exposed. This use of the pressure or head of fluid in seating the piston and keeping it seated is of very great consequence, in that it provides the piston with a flexibility or freedom of action which permits it to pass over obstructions, sediment, and solid substances which enter with the fluid, which, if the piston had not this freedom of movement, would interfere with its regular action and cause friction, prevent accurate registration, and, perhaps, stop the meter. With the piston held not positively in place between two unyielding metal plates, but only by the fluid head or pressure, any sediment or foreign substance is immediately wiped off or disposed of, the piston riding over it if it is of sufficient size to cause it to be lifted, and also gradually moving or throwing it to the center escape-passage. This movement not only adds to the efficiency and durability of the meter, but it also simplifies and cheapens its construction. It is equally applicable to reciprocating-piston meters, and in Figs. 4, 5, and 6 I have represented it as embodied in a reciprocating meter having two pistons, each of which is operated and maintained in contact with the surface of its measuring-chamber and with the edge of the wall about it by the pressure or head of fluid only.

I will but briefly describe the construction of the reciprocating meter, as I have referred to it simply to show the range of my invention and its application to this class of meters.

Referring to Figs. 4, 5, and 6 of the drawings, H is a cylindrical shell or casing closed by the ends or heads $h$ $h'$. This cylindrical casing has the two measuring-chambers M M', each of which contains a reciprocating piston, $m$. Each piston $m$ is arranged to project laterally from a slide-plate, $m'$, and so that its inner edge shall bear against the surface of the measuring-chamber upon which it slides and maintain a contact therewith, and also so that the slide-plate shall bear against the outer edge of the wall which forms the measuring-chamber. These plates and their pistons are held in place by the pressure of the fluid, the plates being arranged in the chamber $M^2$ of the meter, which always contains fluid under an uncontrolled head or pressure. The plates $m'$ also have ports which are adapted to operate in connection with the various passages of the meter to close and open, respectively, the discharge and supply passages at the proper interval of time, the movement of one piston and its plate controlling the movement of the other piston and its plate.

$h^3$ is the inlet of the meter, and $h^2$ the outlet. The fluid, entering the inlet passes directly through the passage then open by the position of the controlling-piston and moves the piston, thereby throwing or moving the fluid in the measuring-chamber of said piston through the discharge-passage thereof while it is receiving the fluid under pressure, and this movement of one piston opens another passage into the other measuring-chamber, by which fluid under pressure enters said chamber and moves the piston therein, causing it in turn to expel fluid from its chamber into its discharge-opening, and also in turn moving its port-plate to close the discharge-passage of the first measuring-chamber. I would state, however, that I do not herein claim this arrangement of piston-chamber supply and escape passages, or the arrangement of the piston whereby one piston governs or controls the operation of the other, as this feature is common in meters. The method, however, of maintaining the pistons and their plates in contact with the surfaces of the measuring-chambers and the edges of the wall thereof, and with the seats of the discharge and opening passages, is only another application of the invention which I have described—that is, of maintaining the piston and its connections in place by the uncontrolled pressure of the fluid acting directly thereon.

I am aware that Letters Patent of Great Britain to Elijah Galloway, No. 11,485, dated December 14, 1846, show a steam-engine having a "free piston," and the same is not broadly claimed. In the said engine the ports are entirely in the flange and in the upper edge or surface of the wall of the measuring-chamber, while in my construction the ports are entirely under the control of the piston proper and are either in or beneath the piston and in the lower plate.

It will be seen that the flange of the piston is only of a size sufficient to separate the measuring-spaces of the chamber from the distributing-chamber when the said measuring-spaces are in operation, and that on this account the meter can be made much smaller than the device shown in the English patent, as that requires that the flange be large enough to entirely cover the measuring-chamber, and never at any time leave the ports which it controls.

Having thus fully described my invention, I claim and desire to secure by Letters Patent of the United States—

1. A fluid-meter having a chamber with one or more measuring-spaces, a distributing-chamber adjacent thereto, a free piston provided with a flange which bears upon the edge of the measuring-chamber, and which separates the measuring-spaces of the chamber from the distributing-chamber, and a series of ports controlled by the piston proper, whereby the said piston is maintained in contact with the measuring-chamber and operated, substantially as described.

2. The combination, in a fluid-meter, of an inlet, a measuring chamber or recess having a wall upon which the edge of the piston overlaps or extends, said piston, a fluid space or recess adjacent to the head of the piston, ports or passages connecting it with the measuring spaces or recesses of the measuring-chamber, and escape ports or passages controlled by the piston proper, connecting the measuring spaces or recesses with an outlet or escape passage, all substantially as described.

3. The combination, in a fluid-meter, of a distributing-chamber, the passage E, the chamber E', the piston D, having the flange D', the ports $d'\ d^2$, the measuring-chamber wall $A^2$, the plate $a^2$, and the discharge ports and passages, substantially as described.

4. The combination of the inlet $a$, the plate $a^2$, the wall $A^2$ of the measuring-chamber, and the casing A, arranged to form the passage E between said inlet and the distributing-chamber E', and uncontrolled passages to the measuring-chamber.

5. The combination of the piston-chamber having measuring spaces or recesses, with the piston B, having the ports $d'\ d^2$, whereby the fluid has access to the measuring-spaces from the distributing-chamber, substantially as described.

6. A fluid-meter having a chamber with one or more measuring-spaces, a distributing-chamber adjacent thereto, a free piston provided with a flange which bears upon the edge of the measuring-chamber, and a series of ports controlled by the piston proper, whereby the said flange may be reduced to a size sufficient only to separate the measuring-spaces of the chamber from the said distributing-chamber when the said measuring-spaces are in operation.

JAMES A. TILDEN.

Witnesses:
W. W. DEWHURST,
E. D. SABIN.